United States Patent [19]

Levine et al.

[11] Patent Number: 4,914,569

[45] Date of Patent: Apr. 3, 1990

[54] METHOD FOR CONCURRENT RECORD ACCESS, INSERTION, DELETION AND ALTERATION USING AN INDEX TREE

[75] Inventors: Frank E. Levine, Austin, Tex.; Chandrasekaran Mohan, San Jose, Calif.

[73] Assignee: International Business Machines Corporation, Armonk, N.Y.

[21] Appl. No.: 115,146

[22] Filed: Oct. 30, 1987

[51] Int. Cl.[4] .................................................. G06F 15/40
[52] U.S. Cl. ................................. 364/200; 364/282.1; 364/282.2; 364/246.6; 364/246.8; 364/300
[58] Field of Search ... 364/200 MS File, 900 MS File, 364/300

[56] References Cited

U.S. PATENT DOCUMENTS

| | | | |
|---|---|---|---|
| 4,604,694 | 8/1986 | Hough | 364/200 |
| 4,606,002 | 8/1986 | Waisman et al. | 364/200 |
| 4,627,019 | 12/1986 | Ng | 364/900 |
| 4,677,550 | 6/1987 | Ferguson | 364/300 |
| 4,698,752 | 10/1987 | Goldstein et al. | 364/200 |

OTHER PUBLICATIONS

"Efficient Locking for Concurrent Operations on B--Trees", *ACM Transactions on Database Systems*, vol. 6, No. 4, Dec., 1981, pp. 650-670.

"Ubiquitous B-Tree", *Computer Surveys*, vol. 11, No. 2, Jun., 1979, pp. 121-137.

"Concurrent Operations on B-Trees with Overtaking", by Sagiv *ACM Sigact-Sigmond Symposium on Principles of Database System*, Mar., 1985, pp. 28-37.

"Index Locking and Splitting", *IBM Technical Disclosure Bulletin*, vol. 25, No. 7B, Dec., 1985, pp. 3725-3927.

"Locking Protocol for Concurrent Operations on B--Trees", *IBM Technical Disclosure Bulletin*, vol. 19, No. 10, Mar., 1977, pp. 3887-3889.

*Data Structure and Algorithms*, by Aho, Hopcroft and Ullman, Addison-Wesley Publishing Company, 1983, pp. 170-179.

"Multilevel Locking with Deadlock Avoidance", *IBM Technical Disclosure Bulletin*, vol. 21, No. 4, Sep., 1987, pp. 1723-1728.

"Locking Technique in a Relational Data Base: Locking on Intents", *IBM Technical Disclosure Bulletin*, vol. 18, No. 7, Dec., 1975, pp. 2324-2326.

"Index Mini-Pages", *IBM Technical Disclosure Bulletin*, vol. 25, No. 11A, Apr., 1983, pp. 5460-5463.

"Locking Mechanism for Controlling Access to Data Base Resources", *IBM Technical Disclosure Bulletin*, vol. 29, No. 3, Aug., 1986, pp. 1193-1195.

"Multi-Access Data Sharing Facility Utilizing Magnetic Bubble Storage", *IBM Technical Disclosure Bulletin*, vol. 23, No. 8, Jan., 1981, pp. 3882-3885.

"Integrated Concurrency and Shared Buffer Coherency Control for Multi-Systems", *IBM Technical Disclosure Bulletin*
(List continued on next page.)

*Primary Examiner*—Thomas C. Lee
*Attorney, Agent, or Firm*—Thomas E. Tyson

[57] ABSTRACT

A method for fetching key record data in a group or record keys according to at least a portion of a key record through an index tree is provided. The index tree provides concurrent accesses of record keys by different transactions. The index tree includes a root node connected to at least one level of nodes, each node having a key record reference to one of more nodes in a next successive level and having bottom nodes that provide access to the key data. The method consists of the steps of (1) traversing across said nodes from said root node by using said key record portion until a bottom node is reached; (2) limiting all but read accesses to the node being traversed and a previously accessed node, to other concurrent transactions; (3) identifying said key record in said bottom node; (4) limiting all but read accesses to said key record; (5) removing all access limitations to traversed nodes; (6) fetching key record data; and (7) removing the access limitation to the key record after the record data has been fetched. Further, methods for inserting and deleting record keys are provided. Additionally, a method for changing the index tree structure while allowing concurrent accesses to take place is provided.

10 Claims, 7 Drawing Sheets

OTHER PUBLICATIONS

*closure Bulletin,* vol. 28, No. 10, Mar., 1986, pp. 4642-4650.

"Copy Currency Control in Distributed Data Networks", *IBM Technical Disclosure Bulletin,* vol. 24, No. 5, Oct., 1981, pp. 2348-2351.

"Performance Without Deadlock Algorithm", *IBM Technical Disclosure Bulletin,* vol. 22, No. 10, Mar., 1980, p. 6759.

"Sharing of Disk Files Without Locking", *IBM Technical Disclosure Bulletin,* vol. 22, No. 7, Dec., 1979, pp. 2887-2889.

"Hardware-Supported Critical Sections to Minimize Process Waiting/Dispatching", *IBM Technical Disclosure Bulletin,* vol. 22, No. 3, Aug., 1979, pp. 1290-1293.

"Spin Queues", *IBM Technical Disclosure Bulletin,* vol. 18, No. 6, Nov., 1975, pp. 1953-1954.

"Locking Architecture in a Multiple Virtual Memory Multi-Processing System", *IBM Technical Disclosure Bulletin,* vol. 16, No. 7, Dec. 1973.

"Transaction Monitoring in Encompass (TM): Reliable Distributed Transaction Processing", by Borr, *Procedures International Conference on Very Large Data Bases,* Sep., 1981, pp. 244-254.

"Robustness to Crash in a Distributed Database: A Non Shared-Memory Multi-Processor Approach", by Borr, *Proceedings 10th International Conference on Very Large Databases,* Singapore, Aug., 1984.

"The Recovery Manager of the System R Database Manager", *ACM Computing Surveys,* vol. 13, No. 2, Jun., 1981, pp. 223-242.

DATA

| EMPLOYEE NAME | EMPLOYEE NUMBER |
|---|---|
| ANDREW | 1 |
| BAKER | 3 |
| CHESTER | 8 |
| EDGAR | 15 |
| EDWARDS | 24 |
| HOWELL | 7 |

FIG. 1

| | 28 | 30 | 32 |
|---|---|---|---|
| 14 | ADDRESS | EDWARDS | 24 |
| 16 | ADDRESS + 2 | EDGAR | 15 |
| 18 | ADDRESS + 4 | ANDREW | 1 |
| 20 | ADDRESS + 6 | HOWELL | 7 |
| 22 | ADDRESS + 8 | | |
| 24 | ADDRESS + 10 | BAKER | 3 |
| 26 | ADDRESS + 12 | CHESTER | 8 |

FIG. 2

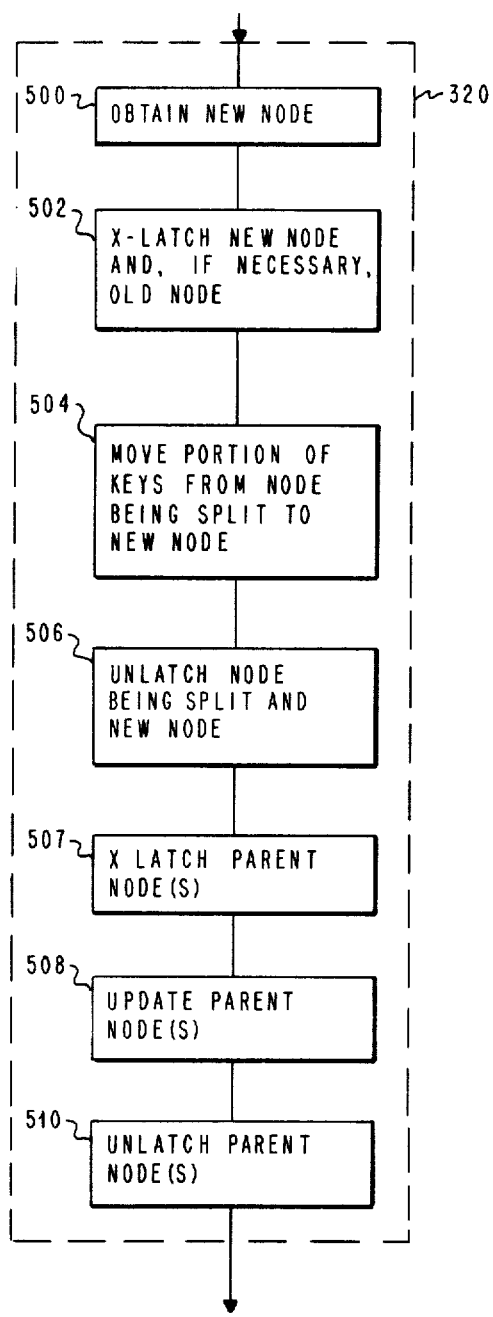
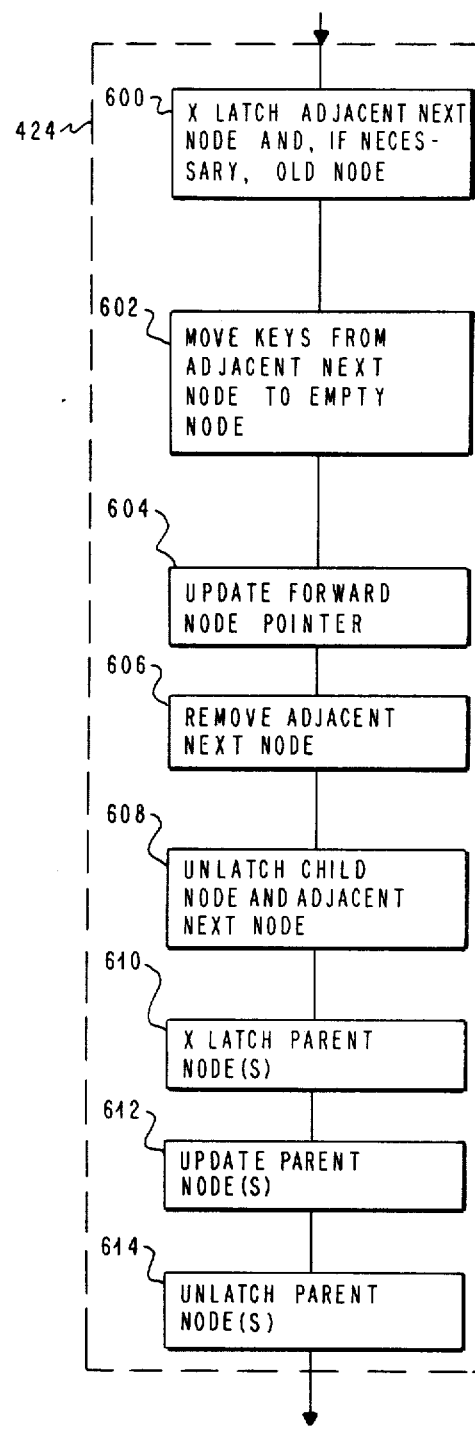
FIG. 9
FIG. 10

METHOD FOR CONCURRENT RECORD ACCESS, INSERTION, DELETION AND ALTERATION USING AN INDEX TREE

TECHNICAL FIELD

This invention relates to data processing and more specifically to database management of records.

BACKGROUND ART

Current data processing systems include database management programs. These programs provide easy access to database tables that each consist of a multiple of records. A relational database program provides access to several different database tables where elements of one database table are contained in another database table. The relational database program allows the user to search, access, and alter data contained in several different database tables using a specific element or field that is common to these database tables. For example, one database table may contain employees' names and employees' serial numbers. Another database table may contain employees' names and employees' salaries. A third database table may contain employees' names and employees' locations. A relational database program may allow the user to access employees' names, employees' serial numbers, employees' salaries, and employees' locations and make changes to these tables without having to individually access each database table separately.

An important aspect of the database programs is the capability to provide fast and efficient access to records in the individual database.

More recent data processing systems provide support to a multiple of users simultaneously enabling each user to access data concurrently.

An index file is commonly used by database management programs to provide quick and efficient access to records in tables. These index files are commonly configured in a B-Tree structure. A reference that discusses the B-Tree is "Efficient Locking For Concurrent Operation On B-Tree" by Lehman and Yao, *ACM Transactions on Database Systems*, volume 6, number 4, Dec., 1981 pages 650–670. Other references addressing B-Tree structures include "The Ubiquitous B-Tree" by Comer, *Computing Surveys*, volume 11, number 2, June, 1979, pages 121–137; and "Concurrent Operation on B-Trees with Over Taking" by Sagiv, *Proceedings ACM SIGACT-SIGMOD Symposium on Principles of Database Systems*, March, 1985, pages 28–37.

The index file configured as a B-Tree structure consists of a root node with many levels of nodes branching from the root node. The information contained in these nodes include pointers to the nodes at the next level or pointers to records in the database. These pointers include further information termed key record information which may reference the records in the database. The record keys are in an ordered form throughout the nodes. For example, an index tree may exist for an alphabetic listing of employee names. The root node would include reference keyed data that relates to records indirectly or directly referenced by the next level of nodes. The reference keys contain information about the index field, i.e. the alphabetic spelling of the employees name. Therefore, the ordered keys in the root node would point to the next successive level of nodes. In other words, the next successive node may indirectly or directly reference all employees names beginning with A, B, and C. A next successive node, parallel with the first successive node, may contain employee records whose last name begin with the letters D–M. The last successive node on this level would reference records of employees with last names starting with N–Z. As one searches through the index file tree, a bottom node is eventually reached. The contents of the bottom node include record keys that point to the individual records in storage.

One problem in providing concurrent accesses to database tables occurs when multiple transactions are trying to access a record at the same time. Specifically, when one user wishes to change a record and another user is attempting to access this record, a contention situation occurs. One solution to the contention problem is to provide exclusive access (or locking) to the records or to the portions of the B-Tree indexes to insure that the index node, or record is not changed while the user is attempting to access it. Locking is addressed in "Index Locking and Splitting" *IBM Technical Disclosure Bulletin*, volume 25, number 7B, December, 1982, pages 3725–3729; and "Locking Protocols for Concurrent Operations on B-Trees", *IBM Technical Disclosure Bulletin*, volume 19, number 10, March, 1977, pages 3887–3889.

The disadvantage to a locking solution is that a lock, while providing access to one user, prevents access by any other user.

It is the object of the present invention to provide a more efficient method of accessing records in a database through an index tree while providing more efficient concurrent access to the database record.

Information in index nodes may be altered during access by several users. These nodes contain the key record information that may be deleted or inserted as records are inserted or deleted into the database table. Information from one node may be moved to another node during a record insert operation because of the limited storage size for a node. The inserting transaction may attempt to move key record information from one node to another in order to accomplish the insertion task. This movement of information during concurrent transaction access may generate error conditions within the concurrent transaction accesses because the index information is being changed. The object of the present invention is to provide concurrent access to the index by several transaction while the index information is being changed without introducing error conditions.

DISCLOSURE OF THE INVENTION

In accordance, with the present invention, a method for fetching key record data in a group of record keys according to at least a portion of a key record through an index tree is provided. The index tree provides concurrent accesses of record keys by different transactions. The index tree includes a root node connected to at least one level of nodes, each node having a key record reference to one of more nodes in a next successive level and having bottom nodes that provide access to the key data. The method consists of the steps of (1) traversing across said nodes from said root node by using said key record portion until a bottom node is reached; (2) limiting all but read accesses to the node being traversed and a previously accessed node, to other concurrent transactions; (3) identifying said key record in said bottom node; (4) limiting all but read accesses to said key record; (5) removing all access limitations to traversed nodes; (6) fetching key record data; and (7) removing the access limitation to the key record after the record data has been fetched.

Further, methods for inserting and deleting record keys are provided. Additionally, a method for changing the index tree structure while allowing concurrent accesses to take place is provided.

BRIEF DESCRIPTION OF THE DRAWING

The novel features believed characteristic of the invention are set forth in the appended claims. The invention itself, however, as well as to other features and advantages thereof, will be best understood by reference to the detailed description which follows, read in conjunction with the accompanying drawings, wherein:

FIG. 1 is a illustration of a database table;

FIG. 2 is a illustration of the database table stored in a computer memory;

FIG. 9 is a flow chart illustrating a node splitting algorithm; and

FIG. 10 is a flow chart illustrating a node collapsing algorithm.

BEST MODE FOR CARRYING OUT THE INVENTION

Figure 3:
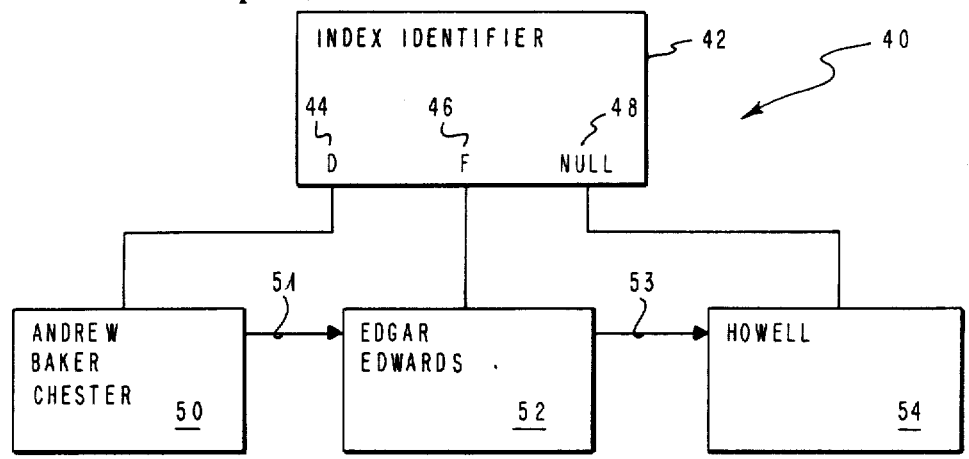
FIG. 3 is a block diagram illustrating a simple B-Tree index.

This invention relates to the accessing of records in a database program. The following example is an overly simplified database access problem provided to enable the reader to more easily understand the invention contained herein. The reader should understand, that, in reality, the number of entries and amount of information that is contained in database tables are much greater than illustrated.

FIG. 1 illustrates table 10 containing employee names and numbers. Each employee record includes a single employee number. The names in table 10 are listed in alphabetical order. However, it should be apparent to those skilled in the art that this is not how the records are normally stored in the computer memory.

FIG. 2 is an illustration of the storage of the employee name/number records in a computer memory 12. Each record 14, 16, 18, 20, 24, and 26 consists of several portions. In record 14, the record first consist of an address portion 28, the employee name 30, and the employee number 32. The address 28 is the actual location of the employee name 30 and the employee number 32 in the computer memory. Table 12 of FIG. 2 illustrates that the storage of the names is not in alphabetical order and is not even contiguous.

The database program normally provides an index tree that enables a user to quickly access a specific record in storage. An example of such an index is provided in FIG. 3. For simplicity of presentation, the index tree is presented in two levels. Index 40 consist of a root node connected to three nodes 50, 52, and 54. The root node 42 is termed "index identifier" and details the type of information in the index. In this example, the index is an alphabetically ordered (ascending) index of the employees' names. Each employee's name includes a key. In this example, the key is the first letter of the employee's name. The keys are used to identify a next level node to be accessed in searching for a specific employee name record. In the root node 42, the keys consist of letters "D" 44, "F" 46, "NULL" 48. The D key 44 directs the user from the root node 42 (the parent node) to node 50 (a child node). Node 50 contains key record information for direct access of the employees Andrews, Baker, and Chester. However, only a single key is used in the root node. This key relates to the highest level of information (or the highest key record) that might now exist or have existed in the node 50. Likewise the "F" 46 directs a user to node 52 that contains the Edgar and Edwards employee names. Lastly, "NULL" 48 directs the user to node 54. The "NULL" key indicates that node 54 is the last successive leaf node. It should be apparent to those skilled in the art that the index 40 may also contains multiple levels of nodes. The two level index 40 is provided for the sake of simplicity.

Figure 4:
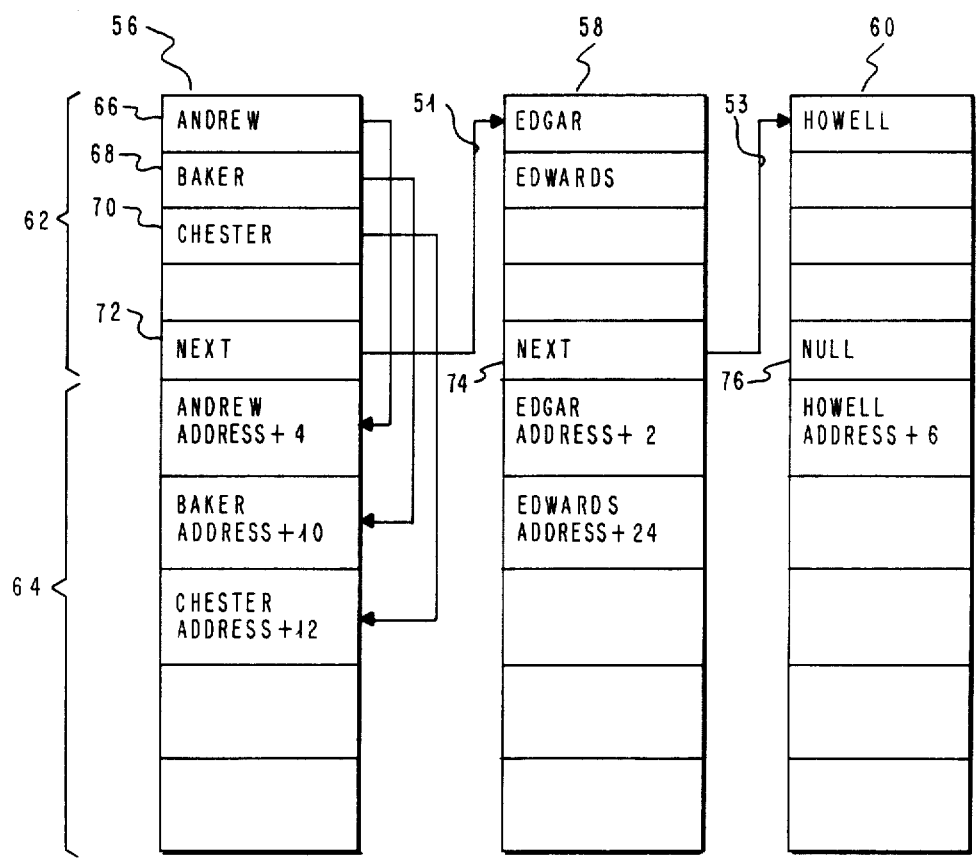
FIG. 4 is an illustration of the storage of index B-Tree node data in a computer memory.

The contents of node 50, 52 and 54 as it would appear in a computer memory is illustrated in FIG. 4 as columns 56, 58 and 60 respectively. Column 56 represents how the information contained in node 50 would be stored in a computer memory. Column 56 consist of a set of pointers 62 and data storage area 64. Pointer 66 points to the information containing the employee name Andrew and employee number. Likewise, pointer 68 points to the employee name Baker and related information. Thus, when a transaction accesses a node, the transaction first examines the pointer portion of the node information to determine where the key record information is stored. This pointer information provides direct access to the storage containing the desired information. In multilevel indexing structure including intermediate levels, the node storage would contain pointers that point to addresses for the next successively located nodes according the key record information. The pointers would be ordered according to their respective key information. However, a successive node, such as 50 that contains several employee names is only referenced by a single key from a parent node. The reference key is the highest key record information allowable in the node. In index trees including intermediate nodes, the key in a preceding (or parent) node is a key for the highest record that is referenced by any of the keys.

Figure 5:
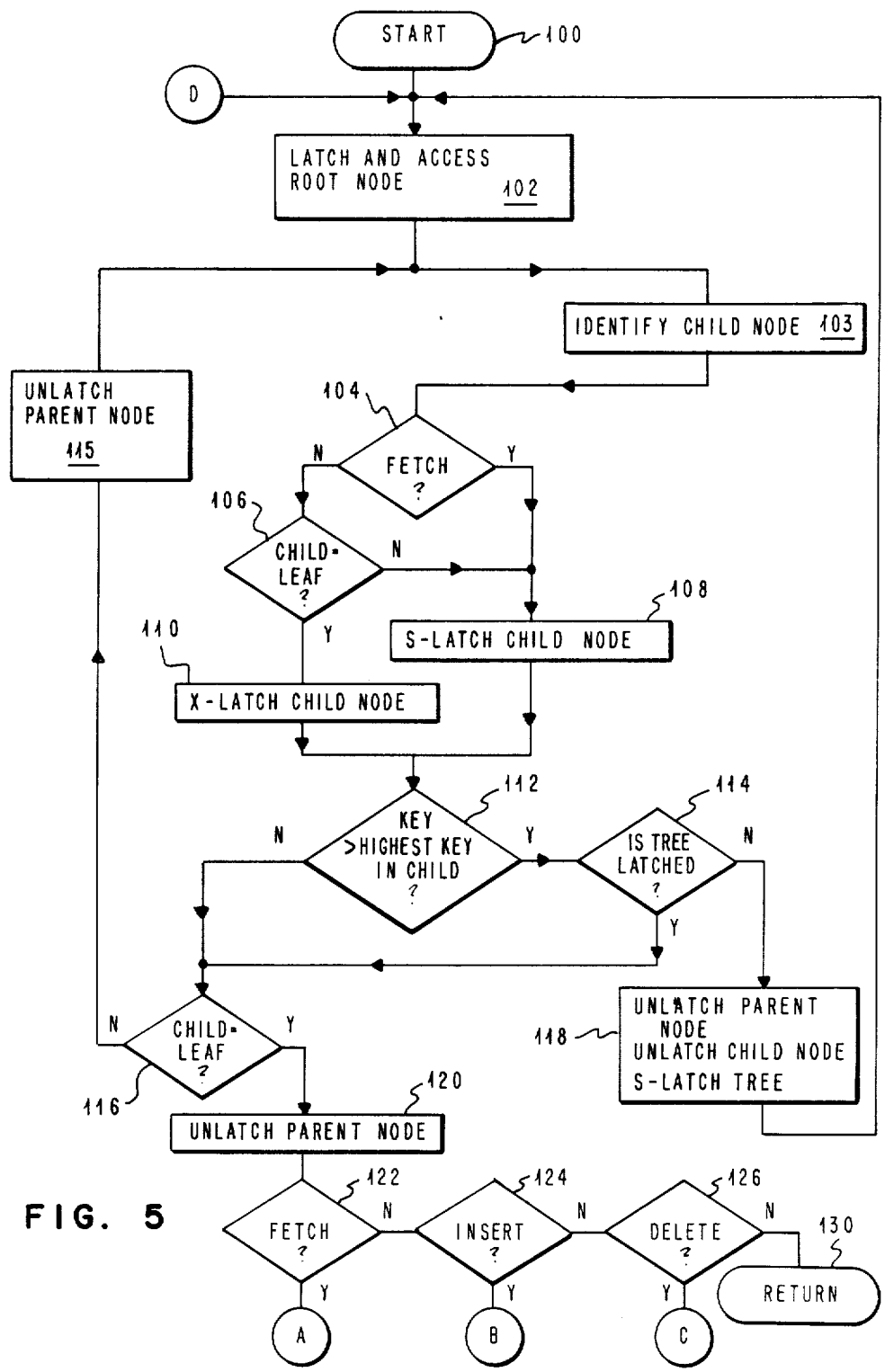
FIG. 5 is a flow chart illustrating the initial search operation through an index B-Tree.

FIG. 5 illustrates a flow chart for accessing record information through the index. It should be understood that in a database management program, the software program illustrated by FIGS. 5–8 is called during an access transaction. In accordance with the illustrated example, the transaction would be attempting to fetch a record to determine the employee number or to perform some other operation such as record insert or record delete operation.

FIGS. 3 and 4 also illustrate pointers 51 and 53 that point from one leaf node to a next successively located leaf node. These pointers 72 and 74 direct an accessing transaction to the next successively located leaf node. In this example, the NULL entry 76 in node 60 indicates that node 60 is the last node.

In FIG. 5, the access program starts at step 100 and proceeds to step 102 where the index root node is S-Latched and accessed. The index identifier node identifies the type of index and provides the initial direction for accessing a record in this example. The index identifier node would identify the index as an alphabetic index in ascending order for the employee names. In step 103, the child node to be accessed would be identified according to the information in the parent node. In step 104, it is determined whether not the operation to be performed is a fetch operation. If the operation is not a fetch operation, in other words the operation is a record insert (or key record insert) or record delete (or key record delete) operation, the program proceeds to step 106 to determine if the next node beneath the parent node is a leaf node or bottom node. If the next node is a leaf node, the program proceeds to the step 110 and acquires an X-Latch on the child node. The X-Latch is an exclusive latch that excludes all other accesses to this node. In other words, the transaction that applies the X-Latch excludes all other transactions from accessing this node.

Returning to step 104, if the operation is a fetch operation or, returning to step 106, if the child is not a leaf node, the program proceeds to step 108 to acquires an S-Latch on the child node. An S-Latch provides limited access to other concurrent users. This limited access provides the other users with the capability to only read the node. No other access, such as the capability to delete or change, is provided. The program proceeds to step 112. In step 112, the program accesses the child node and determines if the key of the record being searched is greater than the key in the child node. If this key is greater, the program proceeds to step 114 to determine if the tree index structure is latched. If the tree is not latched, the program proceeds to step 118 wherein the parent and child nodes are unlatched and the tree is latched. The program then proceeds from step 118 back to step 102 to reinitiate the operation upon the granting of the tree latch. Optimizations are possible to reduce the number of nodes to be accessed when the operation is re-attempted.

In this example, an X-Latch on a tree is provided to indicate to all other accesses that a change in tree structure is being made. If a tree X-Latch access is in progress when a latch is attempted on the tree, the attempting access must wait till the earlier access is complete.

In this example, an X-Latch on a tree is provided to indicate to all other accesses that a change in the index tree structure is being made. An S-Latch on a tree is provided to all other accesses to indicate that no structure changes are being made but other accesses may concurrently access the index tree. No other changes can occur until the S-Latch is released. Tree traversal may occur regardless of the existence of S-Latches or X-Latches. These tree traversals may include key record deletions or insertions.

In step 114 if the tree is latched, or in step 112 if the key is not greater than the highest key in the child, the program proceeds to step 116 to determine if the child is a leaf. If the child is not, the program proceeds to step 115 to unlatch the parent node and then returns to step 103. However, if the child is a leaf, the program proceeds to step 120 to unlatch the parent and then to step 122, 124 and 126 to determine if the operation is a fetch, insert or delete operation. In this example provided, if neither of these three operations are attempted, the program will return to the user in step 130. In practice this return would include an error indicator signifying that the operation to be performed is not identifiable by this accessing program.

Figure 6:
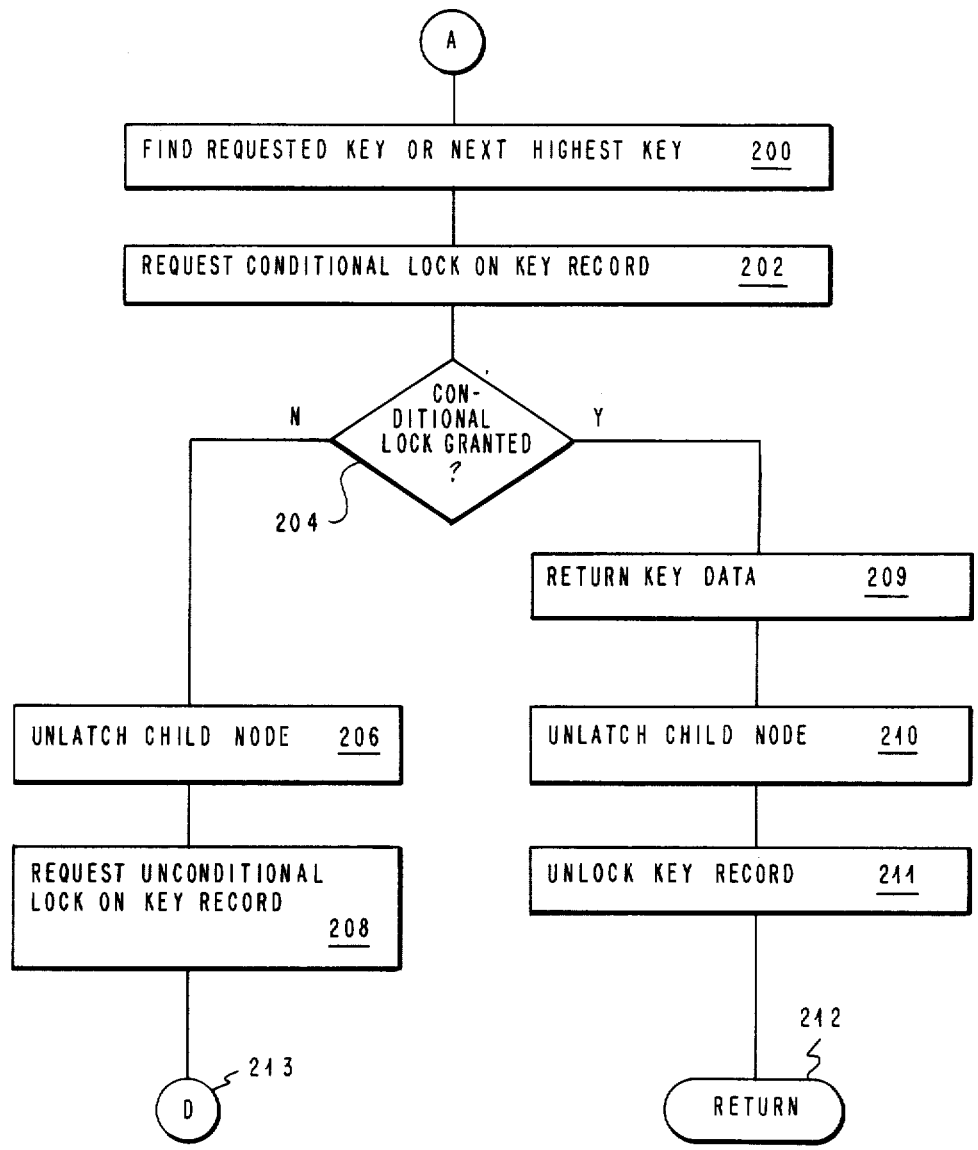
FIG. 6 is a flow chart illustrating a fetch operation through the index B-Tree.

If the operation is a fetch operation, the program proceeds to step 200 illustrated on FIG. 6. In step 200, the program finds the requested key being searched or at least the next highest key. In step 202, the program then requests a conditional lock on the key record. In this example a conditional lock is requested from a managing program that manages the locks on the record keys. The term "conditional" means that if the lock is not immediately granted, a response will be provided to the requesting accessor indicating that such a lock is not being granted. This response is used in Step 204. If the lock has not been granted, the program proceeds to step 206 to unlatch the child node and then to step 208 to request an unconditional lock on the key record. In step 208, the accessor then waits until such lock is granted before it proceeds. Once the lock is granted, it proceeds though connector 213 to step 102 in FIG. 5 to restart the search. Returning to step 204, if the lock has been granted, the program proceeds to step 209 to return the key record data. In step 210, the child node is unlatched. In step 211, the key record is unlocked. It should be apparent to those skilled in the art that step 211 will occur when the transaction is complete or at an earlier time.

Figure 7:
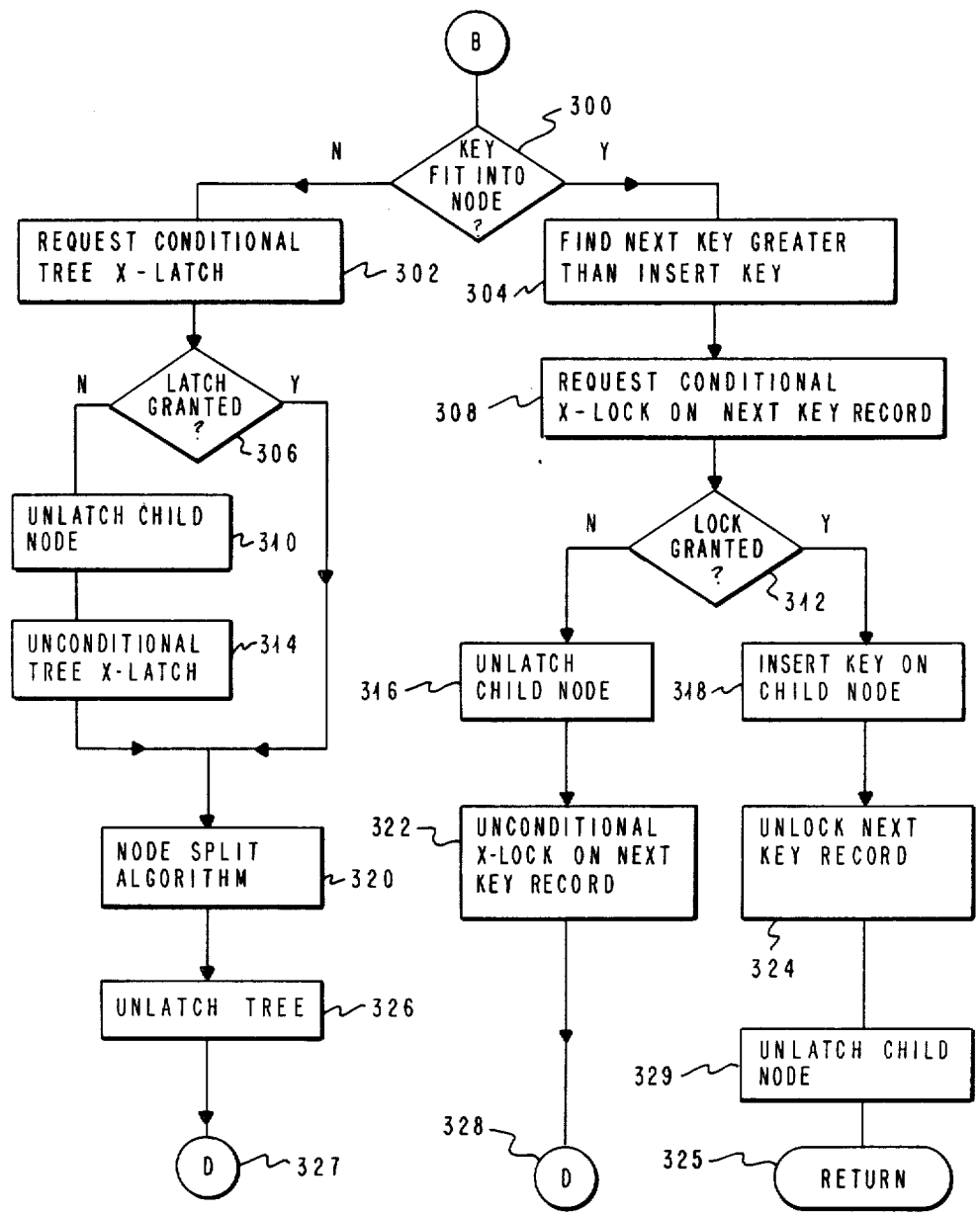
FIG. 7 is a flow chart illustrating an insert operation through the index B-Tree.

In FIG. 7, the insert operation is illustrated. It should be apparent to those skilled in the art that the key record to be inserted will be X-Locked, if necessary, before the insert operation begins. This operation would insert a record in the computer memory and provide an inserted key into the index updating the respective node(s) of the index enabling other transactions to access the newly inserted record. In step 300, it is first determined if the key can fit into the bottom or leaf node. If so, the program proceeds to step 304 to find the next key that is greater than the key to be inserted. If the next key is not in the node, the access is pointed to the next successively located leaf node. If there is no next successively located leaf node, the access finds the null indicator. Then, in step 308, the program request a conditional X-Lock on the next key record. In step 312, it is then determined whether or not this lock has been granted. If so, in step 318 the new key is inserted on the first bottom node that was reached in step 300. In step 324, the next record and key record are unlocked. Also, any held latches are released in step 329. Then, in step 325, the program returns. It should be apparent to those skilled in the art that the lock on the inserted key record will be released when the transaction is complete. Returning to step 312, if the lock is not granted, the program proceeds to step 316 to unlatch the child and then to step 322 to request an unconditional X-Lock on the next key record. The program then returns through connector 328 to step 102 (FIG. 5).

Returning to step 300, if the key will not fit into the leaf node, the program proceeds to step 302 to request a conditional tree X-Latch. In step 306, it is determined whether or not the conditional latch is granted. If not the program proceeds to step 310 to unlatch the child node and then to step 314 to request an unconditional tree X-Latch. Upon being granted the unconditional tree X-Latch or, in step 306 if the latch is granted, the programs proceed to step 320 to perform a node splitting algorithm. This node splitting algorithm provides a new node containing a portion of the information from the previous node. The node splitting algorithm may also provide additional intermediate nodes wherein the additional nodes would be updated. The parent node is modified to contain the highest key record and a pointer to the new node. A node splitting algorithm is illustrated in FIG. 9. Furthermore, node splitting is addressed in *Data Structures and Algorithms*, by Aho, Hopcroft and Ullman, Addison-Wesley Publishing Company, 1983, pages 170-179. Upon completion of the node splitting algorithm, the program proceeds to step 326 to unlatch the tree. The program would then return to step 102 (FIG. 5) through connector 327.

Figure 8:
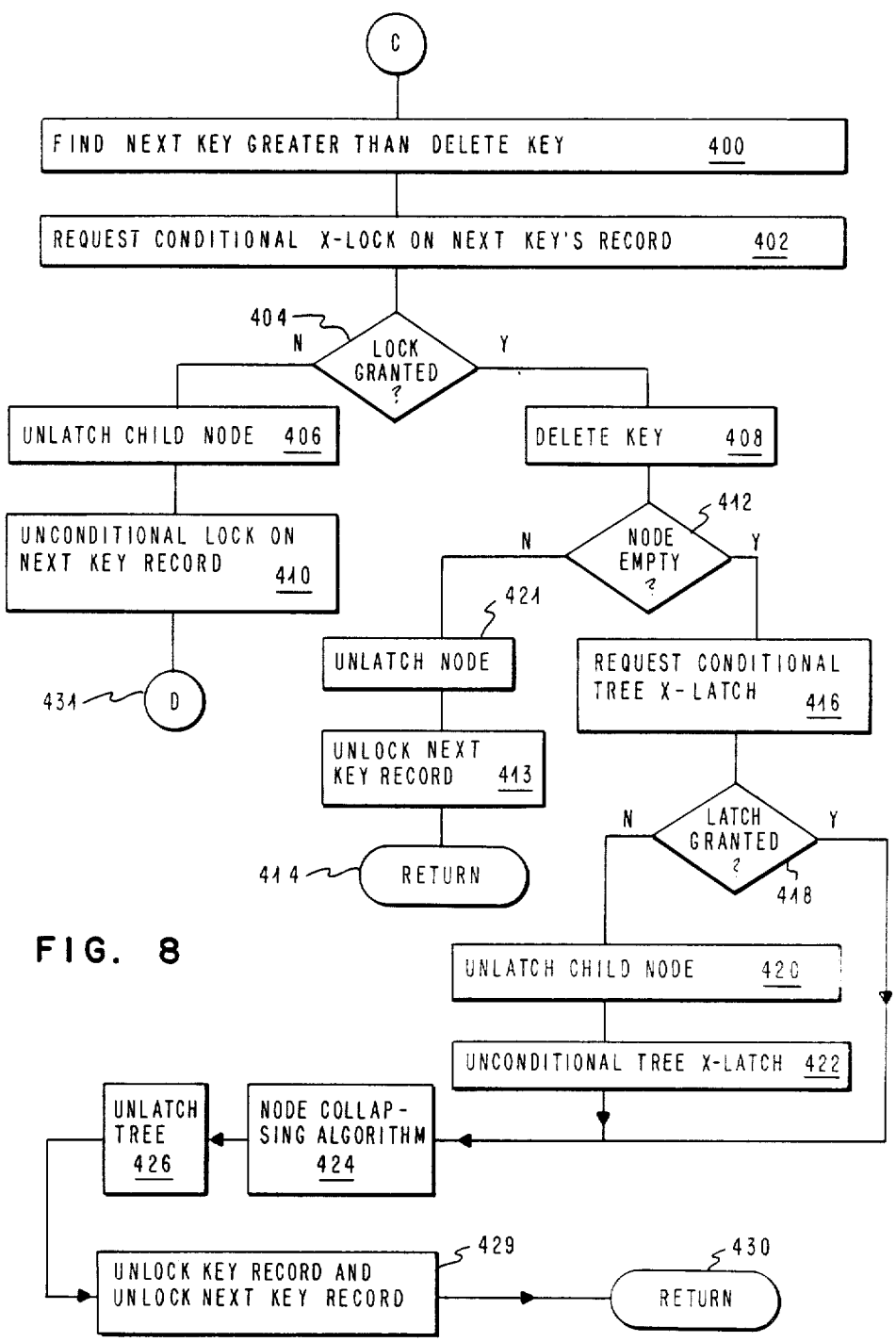
FIG. 8 is a flow chart illustrating the delete operation through the index B-Tree.

FIG. 8 illustrates the delete operation. It should be apparent to those skilled in the art that the key record to be deleted will be X-Locked, if necessary, before the delete operation begins. In step 400, the program finds the next key greater than the key to be deleted. In step 402, the program requests a conditional X-Lock on this next key record. The program proceeds to step 404 to determine if the lock is granted. If the lock is not granted, the program proceeds to unlatch the child node in step 406 and then to request an unconditional lock on the next key record in step 410. The program then proceeds through connector 431 to step 102 (FIG. 5).

Returning to step 404, if the lock is granted, then the key is deleted in step 408. The program then proceeds to step 412 to determine if the next node is empty. If not, the program unlatches the node in step 421, unlocks the next key record in step 413 and returns in step 414. However, if the node is then empty, the program proceeds to step 416 to request a conditional tree X latch. Then in step 418 the program determines if the latch has been granted. If not, in step 420, the program unlatches the child node and then in step 422, proceeds to request an unconditional tree X latch. Once the latch is granted, either from step 422 or from step 418, the program proceeds to step 424 to perform the node collapsing algorithm which removes the empty node and the references to the empty node from the preceding nodes in the index tree. This algorithm is illustrated in FIG. 10. In step 426 the tree is unlatched. In step 429, the deleted key record and the next key record is unlocked. It should be apparent to those skilled in the art that step 429 will occur when the transaction is complete.

FIG. 9 illustrates a node splitting algorithm. In this algorithm a new node is added to the index tree to store the newly inserted key record. Additionally all the preceding, or parent, nodes in the index tree may be updated to reflect the addition of this new node and the information contained therein. In step 500, a new node is obtained. In step 502, the new node is X-Latched. In step 504 a portion of the keys from the node that is being split is moved to the new node. It should be apparent that a pointer is also included in the node being split to reference the new node. Additionally, if required, a pointer in the new node is provided to indicate the next successively located node to the new node. In step 506, the node being split and the new node are both unlatched. In step 507, the parent node to the node being split is then X-Latched. In step 508, the parent node is updated. In step 510 the parent node is unlatched. It should be apparent to those skilled in the art, that the updating of the parent node may actually include the splitting of the parent node and the updating of several successively located parent nodes up the index tree.

FIG. 10 illustrates a node collapsing algorithm. The purpose of the node collapsing algorithm is to remove an empty node from the index tree to conserve memory and to provide efficient access to keys. In step 600, a node adjacent to the empty node is X-Latched. In step 602, the keys of this adjacent node are then moved to the empty node. In step 604, the pointer in the receiving node the keys is then updated to locate the node with newly loaded keys. In step 606, the next node, now empty is removed. In step 608, the latches for the child node, the node with the newly removed keys, and the adjacent node, that has been removed, are unlatched. The parent node or nodes are then X-Latched in step 610. In step 612, the parent node or nodes are updated to remove the pointer to the removed node and to adjust the key associated with the node that receives the keys from the removed node. In step 614, the parent nodes are then unlatched. As discussed in FIG. 9, the updating of the parent node or nodes maybe a recursive process as would be apparent to those skilled in the art.

This invention is for a system that provides for a number of database transactions to concurrently access the index tree. It is an objective of the invention to provide this concurrent access in a manner that guarantees that repeated accesses will provide consistent results within a single transaction if deemed necessary. In other words, the procedure previously illustrated provides that a transaction that is accessing an index tree during the change of index tree by another transaction will not return erroneous or invalid information that may result from accessing a portion of the index tree during this change. This is possible because of the tree latch. The tree latch is used in a way to allow concurrent accesses to the tree during the index tree change. However, the transaction protocol requires that when a condition exists wherein an error is possible, the transaction encountering this possible error condition requests a latch on the tree as opposed to returning an error condition or erroneous data. By requesting a latch on the tree, the requesting transaction must wait if another transaction that, is in fact, changing the index tree structure because this earlier transaction would have also requested a tree latch. When the tree latch is finally granted, the requesting transaction will then be assured that no changes are being made to the index tree structure during its access. This procedure is advantageous over excluding access to the index tree in that it allows concurrent accesses and provides a mechanism to insure that transaction will not retrieve information that is being changed during an index tree structure change.

This invention prevents a first transaction from seeing the result of a second concurrent transaction insert and delete operations until the second transaction is complete.

While this invention has been described with reference to the illustrated embodiment, this description is not intended to be construed in a limiting sense. Various modifications of the illustrated embodiment as well as other embodiments of the invention will become apparent to those persons skilled in the art upon reference to this description. It is therefore contemplated that these appended claims will cover any such modifications or embodiments as fall within the true scope of this invention.

What is claimed is:

1. In a data processing system, a method executed by a data processor for fetching key record data stored in a data processing memory in a group of record keys by using a portion of a key record through an index tree during a transaction in the data processing system wherein other transactions may concurrently access said record keys through said index tree, said index tree having at least a root node, at least one intermediate level of at least one node, each node having a key record reference to one or more nodes in a next lower ordered level of nodes and having bottom nodes that provide access to said key record data, said method comprising the steps of:

(a) traversing across said nodes in said data processing memory from said root node through said intermediate level of nodes by accessing a node using said key record portion of the root node and traversing to a next node indicated by said key record portion of the accessed node until a bottom node is reached;

(b) limiting all but read accesses to the node being accessed and an immediate previously accessed node in said data processing memory, to other concurrent transactions in said data processing system;

(c) identifying and accessing said key record in said bottom node;

(d) limiting all but read accesses to said key record;

(e) removing all access limitations to the accessed nodes including the bottom node except for the accessed key record;

(f) fetching key record data; and (g) removing the access limitation to the key record after the record data has been fetched.

2. A method according to claim 1 wherein said step (c) further includes the steps of:

(c1) identifying and accessing said record keys in said node;

(c2) determining from said record keys in the node if another node is to be accessed;

(c3) if another node is to be accessed, returning to step (a); and (c4) if another node is not to be accessed, identifying the key record data according to the portion of the key record.

3. A method according to claim 2 wherein said step (f) includes the steps of:

(f1) retrieving said key record in said node;

(f2) accessing a record according said key record in said node; and (f3) returning record data from said record.

4. A method according to claim 3 wherein said step (g) further includes waiting until the transaction requiring the fetch of key record data is completed before the access limitation is removed from the key record.

5. In a data processing system, a method executed by a data processor for inserting a single key record in a group of record keys stored in a data processing memory according to a key record through an index tree during a transaction in the data processing system wherein other transactions concurrently access said record keys through said index tree, said index tree having at least a root node, at least one intermediate level of at least one node, each node having a key record reference to one or more nodes n a next successive level of nodes and having bottom nodes that provide access to said record keys, said method comprising the steps of:

(a) limiting all accesses to the key record being inserted;

(b) traversing across said nodes in said data processing memory from said root node through said intermediate level of nodes by accessing a node using said key record of said root node and traversing to a next node indicated by said key record of said accessed node until a bottom node is reached;

(c) limiting all but read accesses to the node being accessed and not more than one immediately previous accessed node, to other concurrent transactions in said data processing system as said nodes are traversed;

(d) identifying a next successively located key record relative to the key record to be inserted in said node and limiting all access to the bottom node;

(e) limiting all accesses to said next successively located key record;

(f) inserting said key record; thereafter, (g) removing the access limitation to the next successively located key record and the bottom node; and thereafter, (h) removing all remaining access limitations to the accessed nodes.

6. A method according to claim 5 wherein step (f) includes the steps of:

(f1) determining if the key record can be inserted in said node;

(f2) if the key can be inserted into the node, proceeding to step (f6);

(f3) if the key cannot be inserted into the node, providing an indication that the index tree structure is being changed;

(f4) altering the index tree structure to add a node to receive the key record;

(f5) removing the indication of an index tree structure change; and (f6) inserting aid key record in the node.

7. In a data processing system, a method executed by a data processor for deleting a key record in a group of record keys stored in a data processing memory according to a key record through an index tree during a transaction in the data processing system wherein other transactions concurrently access said record keys through said index tree, said index tree having a root node connected to at least one intermediate level of nodes, each node having a key record reference to one or more nodes in a next successive level and having bottom nodes that provide access to said record keys, said method comprising the steps of:

(a) traversing across said nodes from said root node in said data processing memory through said intermediate level of nodes by accessing a node according to said key record and traversing to a next node indicated by said key record of said accessed node until a bottom node is reached;

(b) limiting all but read accesses to the node being accessed and not more than one immediately previous accessed node, to other concurrent transactions in said data processing system as said nodes are accessed;

(c) identifying a next successively located key record relative to the key record to be deleted in said bottom node and limiting all access to the bottom node;

(d) limiting all accesses to said next successively located key record;

(e) deleting said key record; thereafter, (f) removing all remaining access limitations to the accessed nodes; and thereafter, (g) removing the access limitation to the next successively located key record.

8. A method according to claim 7 wherein step (e) includes the steps of:

(e1) determining if the key record to be deleted is the only key record in said node;

(e2) if the key to be deleted is not the only key in the node, deleting said key record in the node and then proceeding to step (f);

(e3) if the key to be deleted is the only key in the node, providing an indication that the index tree structure is being changed;

(e4) deleting said key record in the node;

(e5) altering the index tree structure to remove the node; and (e6) removing the indication of an index tree structure change.

9. A method according to claim 8 wherein said step (g) further includes waiting until the transaction requiring the deletion of the key record is completed before the access limitation is removed from the key record.

10. In a data processing system, a method executed by a data processor for altering an index tree structure that provides access to at least one key record in a group of record keys stored in a data processing memory according to a key record for a transaction in the data processing system wherein other transactions concurrently access said record keys through said index tree, said index tree structure having at least one node, said node having a key record reference to either another node or having a key record reference providing direct access to said key record, said index tree including an indication when said index tree is being changed said method comprising the steps of:

(a) determining that no indication of an index tree change is present in said data processing system;

(b) providing the indication of an index tree change that allows concurrent non-altering access to the index tree to said data processing system;

(c) altering said index tree node in said data processing memory;

(d) allowing concurrent non-altering access to said index tree while said index tree is being altered; and (e) removing the indication of an index tree change after completion of said altering step.

* * * * *

UNITED STATES PATENT AND TRADEMARK OFFICE
CERTIFICATE OF CORRECTION

PATENT NO. : 4,914,569

DATED : April 3, 1990

INVENTOR(S) : F. E. Levine et al

It is certified that error appears in the above-identified patent and that said Letters Patent is hereby corrected as shown below:

Col. 9, line 57, delete "nodes n" and insert --nodes in--.

Col. 10, line 8, before "node" insert --bottom--. (1st occurrence)

Col. 10, line 30, delete "aid" and insert --said--.

Col. 12, line 14, delete "node" and insert --node(s)--.

Signed and Sealed this

Third Day of December, 1991

Attest:

HARRY F. MANBECK, JR.

*Attesting Officer*  *Commissioner of Patents and Trademarks*